Feb. 22, 1944.   C. M. PERKINS ET AL   2,342,216
MULTIPLE FREQUENCY-VARIABLE PHASE COUNTERBALANCING DEVICE
Filed March 17, 1941   5 Sheets-Sheet 1

Well load torque — — — —
Counterbalance torque — · — · —
Normal Resultant — — — — —
(Well load and counterbalance)
Harmonic Counterbalance ———
Final Resultant ———

INVENTORS
Charles M. Perkins
Karl D. Kysor
BY Joseph Darley
ATTORNEY.

Feb. 22, 1944.  C. M. PERKINS ET AL  2,342,216
MULTIPLE FREQUENCY-VARIABLE PHASE COUNTERBALANCING DEVICE
Filed March 17, 1941  5 Sheets-Sheet 2
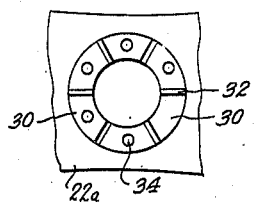
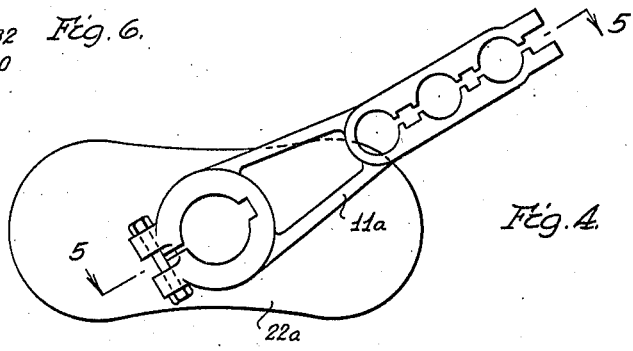
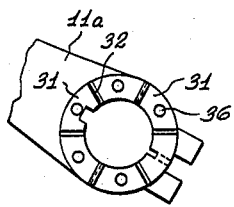
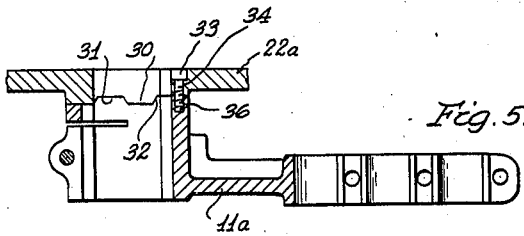
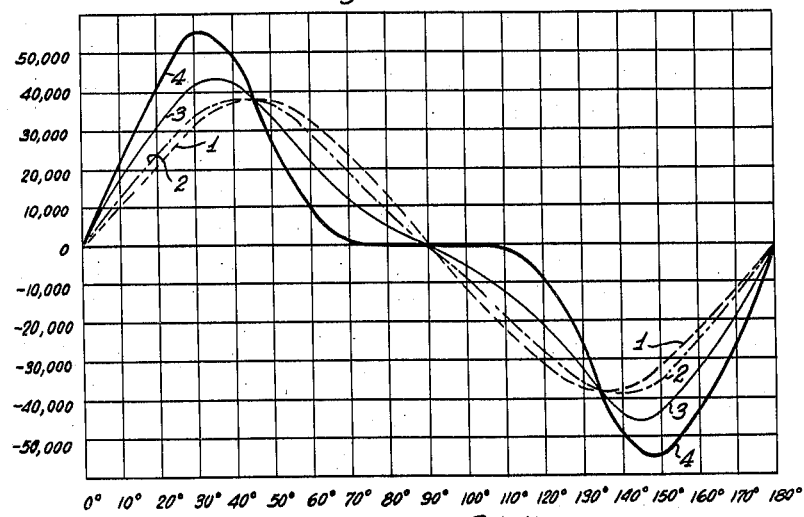
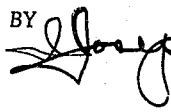
INVENTORS
Charles M. Perkins
Karl D. Kysor
BY
ATTORNEY.

Feb. 22, 1944.  C. M. PERKINS ET AL  2,342,216
MULTIPLE FREQUENCY-VARIABLE PHASE COUNTERBALANCING DEVICE
Filed March 17, 1941  5 Sheets-Sheet 3

INVENTORS
Charles M. Perkins
Karl D. Kysor
BY Joseph Farley

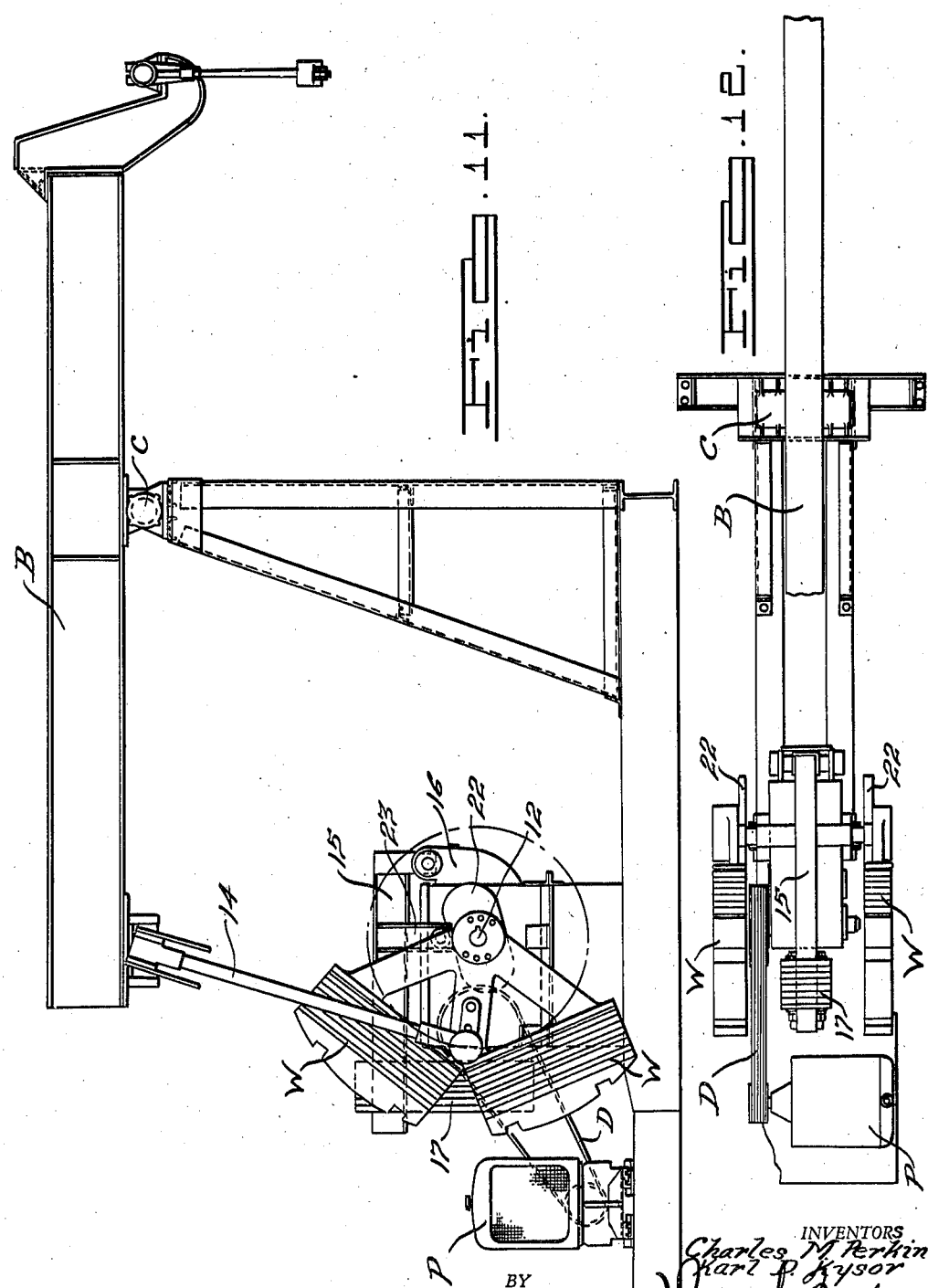

Feb. 22, 1944.　　C. M. PERKINS ET AL　　2,342,216
MULTIPLE FREQUENCY-VARIABLE PHASE COUNTERBALANCING DEVICE
Filed March 17, 1941　　5 Sheets-Sheet 5

INVENTORS
Charles M. Perkins
Karl D. Kysor
BY

Patented Feb. 22, 1944

2,342,216

UNITED STATES PATENT OFFICE 2,342,216

MULTIPLE FREQUENCY-VARIABLE PHASE COUNTERBALANCING DEVICE

Charles M. Perkins, Detroit, and Karl D. Kysor, Northville, Mich., assignors to Palmer-Bee Company, Detroit, Mich., a corporation of Michigan Application March 17, 1941, Serial No. 383,734

5 Claims. (Cl. 74—590)

This invention relates to counterbalancing devices and is particularly designed to be used in connection with oil well pumping units because of the type of load characteristic generally present in the operation of such units. These load characteristics may better be explained by reference to Fig. 3 forming part of the drawings hereof, wherein the operation of a representative well pumping unit is graphically depicted in the form of torque curves showing the torque reactions which occur at the output shaft of the driving unit during a complete revolution of the crank, which is attached to this shaft to actuate the walking beam of the pumping unit when connected therewith by a member known as a pitman, these torque reactions being due to the several forces which act simultaneously upon the walking beam and crank of the unit. The curve A—A shows the well load torque as varying from a positive value of about 280,000 inch pounds during the upward or pumping stroke of the pump plunger to a negative value of about 140,000 inch pounds during the down stroke. Because of this large positive to negative variation, it is customary to add a counterweight which may be either of the oscillating type attached to the walking beam of the pumping unit or of the rotary type attached to the crank of the reducer. The effect of a counterweight of this latter type is shown by the curve B—B to be opposite in direction to that of the well load torque of curve A—A and similar to a sine wave in shape, so that the normal resultant load upon the pumping unit becomes that shown by curve C—C, and operating torque values at the reducer range from a maximum of about 120,000 inch pounds to a negative of about 35,000 inch pounds. It is to be noted that both the positive and negative maxima are reached twice during a complete rotation of the crank or twice during each oscillation of the walking beam. This positive to negative fluctuation in load torque is very objectionable for numerous reasons recognized by those familiar with the operation of pumping units, among which are the stress reversals, strains and very serious impact loads on the driving and reducer units and also on the pump sucker rods due to the resultant torque curve crossing the neutral axis four times during each revolution of the crank, and large overall fluctuations in load values occurring during very short intervals of time. These and other objectionable results of a positive to negative torque cycle produce a general inefficient condition of operation necessitating heavier parts and stronger construction than would be necessary where the negative torque effects are eliminated.

After an extensive analysis of the load curves and torque characteristics encountered in the actual operation of a large number of pumping units, we have found that in nearly all instances the positive to negative fluctuation in normal resultant torque at the reducer is of the type previously mentioned and illustrated by curve C—C of Fig. 3; that is, it occurs during every 180° of crank rotation.

Our analysis has further shown that this type of variation in resultant torque is due to the fact that the total torque required to drive a pumping unit is the sum of a static and a dynamic component. The static torque component is due to the dead weight of the loads and is directly proportional to the difference of the well and counterweight loads, is independent of the speed of operation, and varies from positive to negative values at the same frequency at which the pump plunger reciprocates. The dynamic torque component is due to inertia of the moving parts of a pumping unit and is directly proportional to the sum of the well and counterweight loads, directly proportional to the square of the angular velocity of the crank, and varies from positive to negative values at twice the frequency of the static component. The foregoing relations between these torque components and the other factors entering into the design and operation of a pumping unit can be shown to exist by a mathematical expression for total torque which can be developed on the basis of the analogy which exists between the motion of the plunger of a pumping unit and harmonic motion, but as these relations effect the development of the present invention rather than its construction and operation in any specific installation, it is not thought necessary to set forth herein a detailed exposition of such mathematical expression for the total torque required to drive a pumping unit.

Since a dynamic torque component of greater magnitude than the static component is a common occurrence at certain positions in the cycle of operation of pumping units, and since this dynamic component has both positive and negative values during 180° of crank rotation, the normal resultant torque will necessarily also have positive and negative values, or a double frequency as shown by curve C—C of Fig. 3. In other words, this resultant positive to negative fluctuation occurring during 180° of crank rotation may be said to be in the nature of a second harmonic to the positive to negative fluctuation of the well load torque, which occurs during every 360° of crank rotation.

Therefore, the principal object of the present invention is to secure complete counterbalancing for a pumping unit or other machinery acting upon a reciprocating load of the type discussed herein, by providing means to counteract the dynamic as well as the static effects arising in the driving of such a load.

This invention aims to accomplish this dynamic counteraction by the introduction of a second or supplementary counterbalancing torque, which will have a number of positive and negative periods during a given interval of time equal to the number of positive and negative periods occurring, during the same interval of time, in the resultant torque normally present if such dynamic counteraction were not employed.

A particular additional object is to supply a second or supplementary counterbalancing torque for oil well pumping units which torque will fluctuate at a second harmonic in relation to the normal counterbalancing torque now generally employed in such units.

Another object is to employ means for the introduction of this harmonic counterbalancing effect such as will be simple and positive in operation.

A further object is to employ means such that the inertia effects present because of the reciprocating type of operation of a pumping unit and which inertia effects are more pronounced as the speed of reciprocation is increased, will be to a certain extent compensated for by the operation of the auxiliary harmonic counterbalance.

A further object is to associate the harmonic counterbalance with the pumping unit in such a manner that the phase of the harmonic torque produced by this counterbalance may be varied in relation to the phase of the other torque factors present.

Other objects and advantages of this invention incidental to these principal objects will be recognized from a consideration of the following detailed description of the invention and the accompanying drawings forming a part of this specification and in which Fig. 1 is a side elevation showing the harmonic counterbalance mounted upon the gear box or reducer of a pumping unit.

Fig. 2 is a detailed section taken along the line 2—2 of Fig. 1 showing a manner in which the cams used for actuating the auxiliary counterbalance may be secured to the crank of the reducer.

As previously mentioned, Fig. 3 is a graph showing the torque curves of the various factors which combine to form the resultant torque load upon the driving unit.

Fig. 4 is a side view of one of the actuating cams as associated with the crank of the reducer.

Fig. 5 is a section taken along the line 5—5 of Fig. 4 showing an alternate manner in which the actuating cam may be secured to the crank of the reducer.

Fig. 6 is a partial view of the hub of the actuating cam showing the construction of Fig. 5, and Fig. 7 is a similar view of the hub portion of the crank, also showing this construction.

Fig. 8 is a graph depicting the torque of the harmonic counterbalance as influenced by inertia effects at various speeds of rotation of the reducer output shaft.

Fig. 11 is an elevation of an assembly of the counterbalance mechanism as applied to a walking beam and pumping unit employing rotary type counterweight.

Fig. 12 is a top view of the unit shown in Fig. 11.

Figure 1:
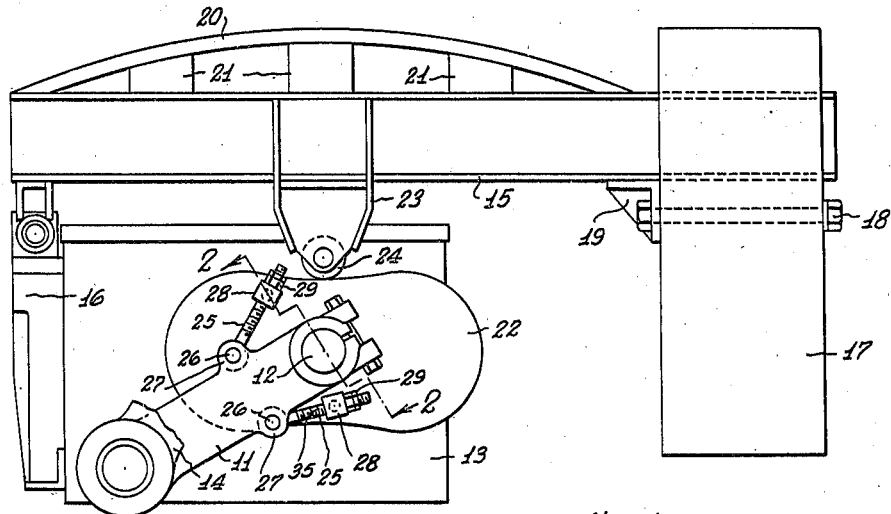

In Fig. 1 of the drawings a crank 11 is shown attached to the output shaft 12 of the gear box or reducer 13. A portion of a pitman 14 is shown secured to the outer end of the crank 11, this pitman being connected to the walking beam of the pumping unit. As the pitman, walking beam, counterweights and other related parts of an ordinary pumping unit are well-known and form no part of the present invention, they are not included in the drawings. The harmonic counterbalance of the present invention consists of a cantilever beam 15 pivotally anchored to a suitable bracket 16 attached to one end of the gear box 13. A counterweight 17, preferably consisting of a number of smaller weights bolted together, is attached to the free end of the beam 15 such as by bolts 18 securing this counterweight to a suitable bracket 19 provided for this purpose. While the cantilever beam 15 may be of any suitable construction to withstand the forces encountered in its operation, a standard I-beam is employed in the form illustrated, this I-beam being strengthened by the additional arch bracing consisting of a curved channel member 20 welded to the beam 15 adjacent its ends and also secured thereto at positions intermediate its ends by plates 21. Oscillation of this beam and counterweight is caused by a cam 22 which rotates with the crank 11 of the reducer and which acts upon the counterbalance through a cam follower 23 connected to the cantilever beam 15. This cam follower 23 consists of a depending bracket secured to the cantilever beam 15 and in which bracket a roller 24 is mounted so as to contact the peripheral surface of the cam 22. In any installation where dual crank and pitman assemblies are used, one on each side of the gear box or reducer, it is intended that the cam and follower structure shown in Fig. 1 be duplicated on the opposite side of the gear box 13 so that the forces set up by the oscillation of this auxiliary counterbalance will be evenly distributed upon the gear box.

Figure 2:
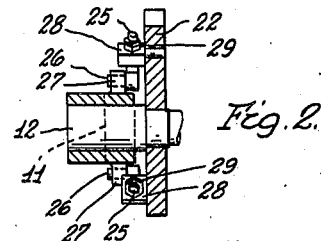

Alternate methods are illustrated which may be employed in connecting the cam 22 to the crank 11. The first of these is shown in Figs. 1 and 2 and comprises a pair of eye-bolts 25, secured to the crank 11 by pins 26 which pass through bosses 27 formed on the crank and through the heads of the eye-bolts. Blocks 28 are pivotally secured to the surface of the cam 22 as shown in Fig. 2 and the shank portons 35 of the eye-bolts 25 extend through these blocks 28. The cam 22 can then be bolted to the crank 11 so as to be driven thereby by placing nuts 29 upon the eye-bolts so as to engage the outer faces of the blocks 28. By simultaneously tightening up on one eye-bolt and loosening the other the angular position of the cam relative to the crank may be changed within limits fixed by the length of the threaded shank portion 35 of the eye-bolts, and in this manner the phase of the torque effect produced by the oscillation of the auxiliary counterbalance will be varied in relation to the phase of the resultant torque effect normally imposed upon the driving unit.

Figure 9:
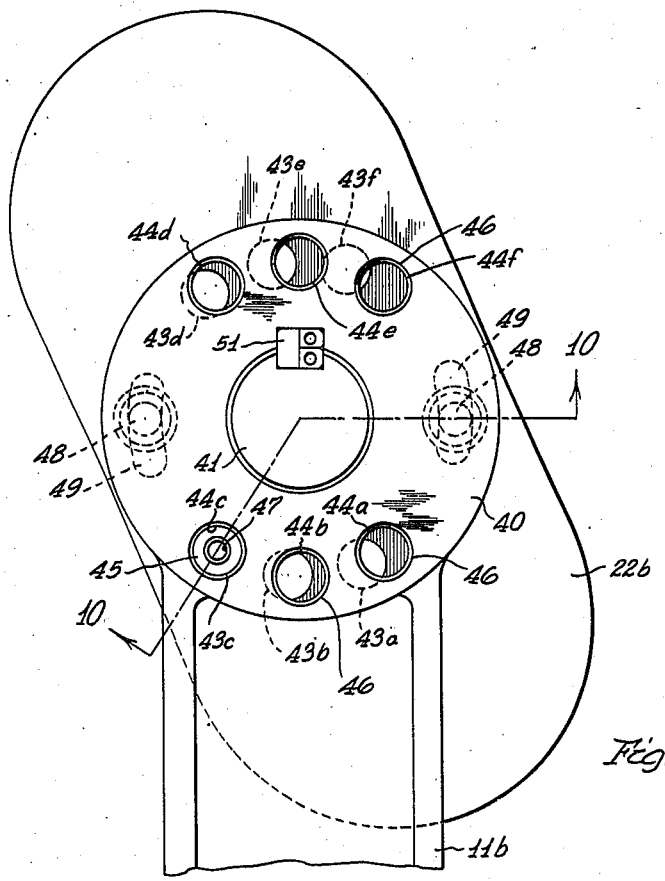
Fig. 9 is an elevation of the outer face of the hub of a crank and actuating cam showing a third manner by means of which these two members may be associated in various angular positions.
Figure 10:
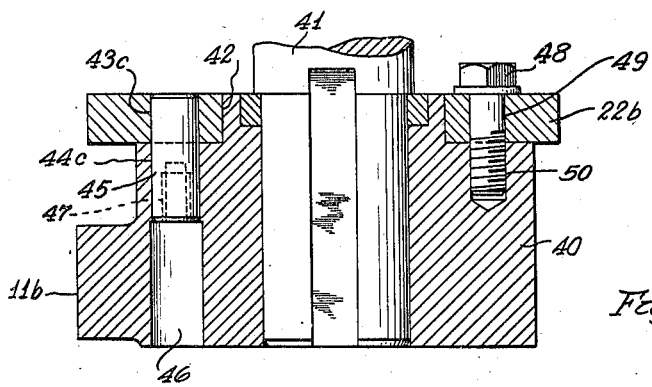
Fig. 10 is a sectional view along the line 10—10 of Fig. 9 showing the construction in detail.

The preferred manner in which the actuating cams are associated with the cranks in installations where it is desired to provide for phase adjustment of the harmonic counterbalancing torque while the unit is in service is shown in Figs. 9 and 10 and consists of a system of differential indexing. By providing a series of holes in the faces of both the actuating cam and the adjacent hub of the crank, the holes in the cam having a different angular spacing than the holes in the crank, it becomes possible to vary the angular relationship between the cam and the crank through a number of increments depending upon the number of holes provided and their relative angular positions. Thus, in Fig. 9 a cam, 22b, is shown connected to the inner face of the hub 40 of a crank 11b, which is mounted upon an output or low-speed shaft 41 of a reducer and is keyed to such shaft by a key 51 so as to be driven thereby. A shoulder 42 is formed on the inner face of the hub 40 of the crank to receive the hub portion of the cam 22b. A series of indexing holes 43a to f, inclusive, are formed in this hub portion of the cam and a corresponding series of indexing holes 44a to f, inclusive, are formed in the hub of the crank at an equal distance from the center of rotation but having a different angular spacing than the indexing holes of the cam. The cam is driven from the crank by aligning any correspondingly lettered pair of indexing holes of both members and inserting a driving pin 45 as shown in the cross sectional view of Fig. 10. It will also be observed from this view that the indexing holes 44 in the hub of the crank are provided with a counterbored portion 46 toward the outer face of the hub so that the driving pin 45 may more readily be inserted and removed from driving position. To facilitate such removal the outer portion of the pin 45 is internally bored and threaded as indicated by the reference 47 so that a puller tool may be used. When the cam 22b has been properly indexed on the hub of the crank 11b and the driving pin 45 has been inserted, the cam and crank are then securely clamped together by a pair of bolts 48 which extend through arcuate slots 49 formed in the hub portion of the cam and engage threaded holes 50 in the hub 40 of the crank. These slots 49 must be dimensioned according to the total amount of phase adjustment provided by the particular combination of indexing holes used in any particular case.

The specific combination of indexing holes shown in Fig. 9 is designed to provide a phase adjustment in 5° increments from a phase angle where the cam lags the crank by 7½° to a phase angle where the cam lags the crank by 32½°. In the position shown, where the holes 43c and 44c are indexed and held in this position by the driving pin 45, the angular relation of the cam relative to the crank is a phase angle of 22½° lag so that a curve of counterbalance torque such as the curve DD of Fig. 3 will be produced.

A form of jaw clutch is used in the third method for attaching the cam to the crank. As shown in Fig. 5, the adjacent surfaces of the cam 22a and crank 11a are formed with a series of engaging jaws 30 and 31, respectively. The sides of these jaws are provided with radial tapered faces 32 which are held in contact by recessed bolts 33 passing through holes 34 provided in the hub of the cam 22a and engaging threaded holes 36 formed in the hub of the crank 11a. It will be seen that in the crank 11a and cam 22a shown for the purposes of illustration, but three sets of jaws are employed. In actual production, however, a greater number of jaws will frequently be used as the angular relation of cam and crank can be varied, depending upon which jaws are in engagement. Thus, if in a particular installation it will be desirable to have an available phase adjustment of the auxiliary counterbalance torque in small increments, a number of jaws will be used commensurate with the size of such increments. For example, if it is desirable to have a phase adjustment in steps of four degrees, 90 jaws will be provided on both the cam 22a and the crank 11a.

In all these various means for driving the actuating cam one common feature is to be noted, and that in all instances the cam is directly attached to and driven by the crank and is never directly secured to the output or low speed shaft of the reducer so as to be in driven relationship therewith. Because of this feature the alternating stresses accompanying the oscillation of the auxiliary counterbalance are not transmitted to the output shaft of the reducer and thence to the gearing in such reducer, but rather the torque upon the output shaft is the net result of the torque required to operate the well load and main counterbalance and the torque required to operate the auxiliary counterbalance. In other words, the addition of the forces which together comprise the final resultant torque shown by curve EE of Fig. 3 occurs externally of the reducer and driving units. If the actuating cams were keyed directly to the reducer output shaft it can readily be seen that the process whereby the normal resultant torque (curve CC of Fig. 3) is counteracted by the auxiliary counterbalance torque (curve DD of Fig. 3) would induce fluctuating torsional stresses in the reducer output shaft or, in other words, would set up a torsional vibration. The elimination of such torsional vibration, as accomplished by the constructions shown herein, has a marked effect upon the operation of the pumping unit as a whole, as such a torsional vibration would ordinarily be transmitted through the crank and pitman and similar or harmonic vibrations would be induced in the entire pumping unit. This induced vibration is particularly important in its effect upon the sucker rods because of their relatively small diameter, great length and the great stresses to which they are subjected. Under these conditions such a vibration can cause frequent failure of the sucker rods from fatigue and will increase the amount of stretching present. When stretching of the sucker rods is reduced the operation of the check valve in the bottom of the well casing becomes much smoother and efficient and the volumetric efficiency of the pumping unit is increased.

Referring again to Fig. 3, the results obtained from an auxiliary counterbalance of the type herein described are graphically depicted. Curve D—D represents the counterbalancing torque produced, which can be seen to be a second harmonic of the normal counterbalance torque of curve B—B and to have the same frequency as the resultant curve C—C, which indicates the load upon the drive and reducer unit that would prevail were the harmonic counterbalance of this invention not provided. Through the introduction of the harmonic counterbalancing torque of curve D—D, however, normal resultant torque of curve C—C is modified to give the final resultant torque shown by curve E—E. The instantaneous torque values of this latter curve are at all times positive while its peak torque values are approximately 60,000 inch pounds as contrasted with the normally prevailing peak torque values of curve C—C which are about 120,000 inch pounds. Furthermore, curve E—E shows that negative torque effects have been completely eliminated from the operation of the pumping unit and that a substantially steady net torque is imposed upon the low speed or output shaft of the reducer, further demonstrating the elimination of the previously discussed torsional vibrations from this shaft, and consequently from the entire unit.

While both the resultant curve C—C and the harmonic counterbalance curve D—D vary between peak positive and negative values during 180° of crank rotation, it is to be noted that the counterbalancing torque of curve D—D is not 90° out of phase with the resultant torque, as would ordinarily be expected with a counteracting torque of this type, but has had its phase adjusted so as to lead or lag the resultant torque curve C—C by the correct amount in order that the positive and negative phases and peak values of both curves will be oppositely disposed to a neutral axis in as great an extent as is possible in view of the non-uniform character of the variation in the resultant torque of curve C—C.

Figure 3:
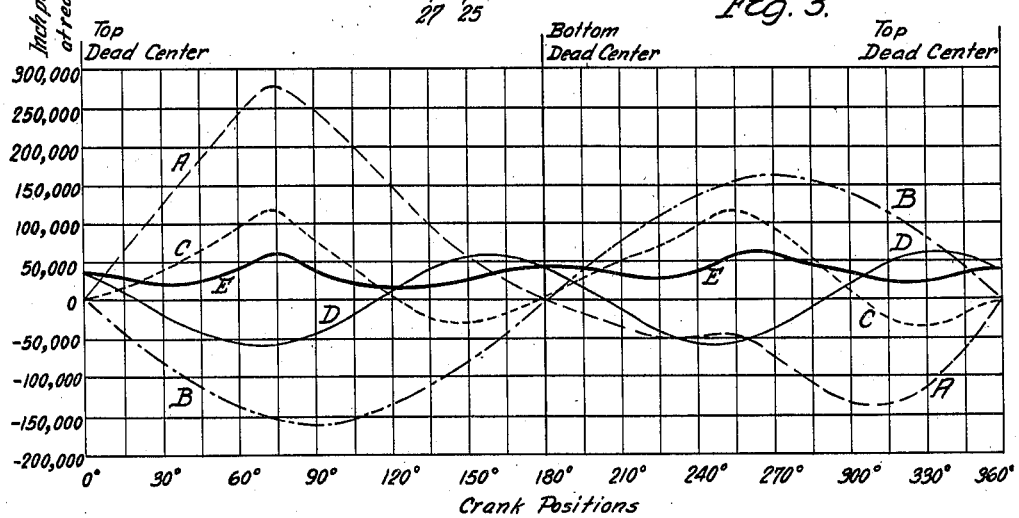

Generally speaking, some phase adjustment of the harmonic counterbalancing torque will be made in all installations of this invention. The reason for this can be understood from a further consideration of curve C—C which is representative of the prevailing situation. The positive loops of this curve extend through more than 120° of crank rotation while less than 60° of crank movement is occupied by the negative loops, a cycle being completed every 180°. Were a torque, having a variation of this nature, counteracted by a counterbalance which induces torque having a uniform variation in alternate positive and negative loops each extending through 90° of crank rotation, it can readily be seen that maximum counteracting effect would not result because the peak values of normal resultant and harmonic counterbalance torques would not be oppositely disposed. For example, the normal resultant curve C—C of Fig. 3, which has a positive peak value occurring after about 75° of crank rotation, would be opposed, if no phase adjustment were used, by a counterbalance torque whose maximum negative value occurs after about 45° of crank rotation, or approximately 30° too soon. Therefore, the counterbalance torque should lag the normal resultant torque to an extent such that the greatest possible counteraction will be obtained for both positive and negative values of normal resultant torque. Thus, harmonic counterbalance curve D—D of Fig. 3 lags the normal resultant curve C—C by about 22°. When harmonic counterbalancing is applied to a well which has been in use long enough for operating conditions of the pumping unit to become stabilized, the proper amount of phase adjustment, or, in other words, the correct angular relationship between the cams 22 and the cranks 11 can readily be graphically determined by a series of curves such as shown in Fig. 3. In such cases, the phase relation, when once decided upon, is usually fixed at that point for the unit, no provision being made for phase adjustment. On the other hand, where the pumping unit has no stabilized or average operating condition, or where the unit is to be installed on a new well where the operating conditions are not exactly known, the actuating cams 22 will be connected to the cranks 11 by one of the aforementioned means which allow for a change in angular relationship between the two, in order that maximum counteracting effect may be derived from the harmonic counterbalance as operating conditions vary.

While other means, such as a rotary counterbalance or some form of spring device, can and have been used for the production of a harmonic counteracting torque, the oscillating type of counterbalance was adopted in the present invention as a result of a thorough analysis of the problem of counterbalancing a reciprocating load such as encountered in oil well pumping units. This analysis showed that where a harmonic counteracting torque is to be induced, an oscillating type of counterbalance is the best means available for its induction, because this type has a more complete counterbalancing effect over the range of operation of a pumping unit.

Referring again to the discussion of the factors influencing the normal resultant torque of a pumping unit, appearing in the introductory portion of this specification, it was seen that the component of that torque attributable to dynamic or inertia effects was directly proportional, among other things, to the square of the angular velocity of the crank. Consequently, a change in angular velocity of the crank, or, in other words, a change in operating speed of the pumping unit, will change the resultant torque; and as the operating speed is increased the degree or extent of change becomes more pronounced. In general, it may be said that the effect of inertia upon normal resultant torque when depicted in a curve similar to the curve C—C of Fig. 3, is to give increasing positive and negative peak values and increasing slopes as the operating speed is increased. The location of the transition points, or the points where the curve crosses the neutral axis in changing from positive to negative values, or vice versa, are not greatly affected, so that the net result of inertia is to re-distribute the curve of normal resultant torque, giving higher peak torque values as the operating speed of the unit is raised. As a consequence, additional harmonic counterbalancing torque is required at higher speeds and is obtained from an oscillating type of counterbalance in the manner illustrated by the series of curves comprising Fig. 8 which are representative of the torque variation of the oscillating harmonic counterbalance of this invention during one-half of a revolution of the actuating cam. The series of curves show that as the operating speed increases, the slopes of the sine wave 1—1, showing static counterbalancing torque, gradually increase, while at the same time the peak values become greater and at advancing positions for positive torque and retarding positions for negative torque, this variation being illustrated by curves, 2—2, 3—3 and 4—4 taken respectively at 10, 20 and 30 revolutions per minute of the actuating cam (or reducer output shaft). Although the curve 4—4 presents an extreme condition not likely to be encountered in normal operation, it is apparent from the shape of each successive curve that an increased peak counterbalancing effect is produced at an increased speed. Hence the effect of inertia upon normal resultant torque is automatically counteracted in the operation of the oscillating harmonic counterbalance of this invention.

A further important advantage of the device described herein arises from the fact that the counterbalance is cam driven. While the shape of the cam 22, illustrated in the accompanying drawings, is such that the counteracting torque produced has a uniform positive to negative variation in approximately a sine wave as shown by curve D—D, Fig. 3, the shape of the cam may be varied, if desired, so that the curve of the counteracting torque produced may have other configurations. In this respect, it is theoretically possible to design a shape of actuating cam directly from the normal resultant torque curve C—C so that the counteracting torque would then have the same variation as the normal resultant torque, but oppositely disposed in phase. The final resultant torque of curve E—E would, in this case, become a straight line, which is, of course, the ideal condition. The one limitation upon the designing of cams shaped to more exactly produce an ideal counteracting harmonic torque is the ability to have the roller follower 24 remain in contact with the periphery of the cam at all times during a complete rotation thereof and at all speeds normally encountered throughout the range of the pumping unit with which such cam is used. Our analysis of the types of load and operating conditions normally encountered in oil well pumping units has shown that as far as actuating cam design is concerned a two-lobe form of cam, such as the cam 22 illustrated, will generally be used as this will give the double frequency necessary to counteract the double frequency, normally encountered in the resultant torque present when no harmonic counterbalance is used. In isolated instances, it may be found that the fluctuation in normal resultant torque becomes in the nature of a third harmonic to the well load torque, in which case a three-lobe actuating cam can be employed on the auxiliary counterbalance to give a counteracting torque of the same harmonic, providing the above-mentioned limitation concerning the cam follower is satisfied.

To mention a few of the other advantages, since the counterbalance of this invention exerts its counteraction externally of the reducer unit, negative torque effects and accompanying backlash within the reducer are eliminated, which means that instantaneous values of loads on the gears of the reducer are reduced by amounts up to 100% by the elimination of the impact loads produced by backlash. Any rotary type of harmonic counterbalance, driven by gearing, will necessarily be confronted with the terrific impact loads accompanying cyclical changes in counterbalancing effect, and as a result the effect of backlash, which will inevitably be present in such gearing, will allow very destructive impacts to occur in the entire mechanism. The inducement of counteracting torque by means of various forms of spring devices has always been subject to the detriment of spring failure. In contrast, trouble-free operation of the present counterbalancing device is insured by the simplicity of its design. The parts principally subject to deterioration, namely, the peripheral surfaces of the actuating cams 22 and the roller followers 24, can be made highly wear resistant by suitable heat treatment, such as nitriding or case hardening and by use of one of the many commercially available forms of anti-friction bearings upon which the roller followers may be mounted.

A further advantage is that when negative torque is completely eliminated from the operation of a pumping unit, as is accomplished by this invention, the input power required to drive the unit is decreased on the average by one-third the amount required where the invention is not incorporated. This, of course, means that a considerable saving can be effected in the size of prime mover required. The efficiency of operation of the prime mover was also effected under the conditions of high impact loads and greatly fluctuating torque requirements heretofore present in a pumping unit, because under such conditions it was impossible to operate a modern high speed internal combustion engine as a prime mover and obtain anywhere near maximum efficiency from such engine. At the same time, it has always been desirable to use such high speed engines as prime movers in place of the older low speed engines because of the great difference in cost between the two in favor of the high speed type. Under the conditions resulting from the use of this invention the pumping unit can be operated at higher speeds and consequently a high speed engine can be operated at its designed working speed of maximum efficiency.

It is understood that changes and modifications in the representative designs disclosed herein may be made, in order to adapt the counterbalancing device of this invention to particular installations without departing from the scope of the invention as defined by the following claims.

We claim:

1. A driving mechanism for a crank driven load member producing a resultant load having a double frequency torque fluctuating between positive and negative values, said driving mechanism comprising a driving shaft carrying said crank, means to counteract the torque fluctuation of said resultant load including a counterbalance and means operated by said driving mechanism for causing oscillation of said counterbalance, said last named means comprising an actuating cam for said counterbalance mounted on said shaft and driven by said crank, and a cam follower contacting said actuating cam, said actuating cam having a contour causing oscillation of said counterbalance to produce a torque fluctuating between positive and negative values at the frequency of said fluctuation of said resultant load but oppositely disposed in phase so as to oppose said fluctuation of said resultant load and substantially prevent the same from being applied to said shaft.

2. A driving mechanism for a crank driven load member producing a resultant load having a double frequency torque fluctuating between positive and negative values, said driving mechanism comprising a driving shaft carrying said crank, means to counteract the torque fluctuation of said resultant load including a counterbalance, a pivoted beam supporting said counterbalance, and means operated by said driving mechanism for causing oscillation of said beam and said counterbalance, said last named means comprising an actuating cam mounted on said shaft and driven by said crank, and a cam follower carried by said beam and contacting the periphery of said actuating cam, said actuating cam having a contour causing oscillation of said beam and counterbalance to produce a torque fluctuating between positive and negative values at the frequency of said fluctuation of said resultant load but oppositely disposed in phase so as to oppose said fluctuation of said resultant load and substantially prevent the same from being applied to said shaft.

3. A driving mechanism for a crank driven load member producing a resultant load having a double frequency torque fluctuating between positive and negative values, said driving mechanism comprising a driving shaft carrying said crank, means to counteract the torque fluctuation of said resultant load including a counterbalance and means operated by said driving mechanism for causing oscillation of said counterbalance, said last named means comprising an actuating cam for said counterbalance mounted on said shaft and rotated by said crank, and a cam follower contacting said actuating cam, said actuating cam having a contour causing oscillation of said counterbalance to produce a torque fluctuating between positive and negative values at the frequency of said fluctuation of said resultant load but oppositely disposed in phase so as to oppose said fluctuation of said resultant load and substantially prevent the same from being applied to said shaft, and means for changing the angular position of said cam relative to said crank arm to adjust the phase relation between the fluctuating torque of said load and the fluctuating torque produced by said counterbalance and cam.

4. A driving mechanism for a crank driven load member producing a resultant load having a double frequency torque fluctuating between positive and negative values, said driving mechanism comprising a driving shaft carrying said crank, means to counteract the torque fluctuation of said resultant load including a counterbalance and means operated by said driving mechanism for causing oscillation of said counterbalance, said last named means comprising an actuating cam for said counterbalance mounted on said shaft and driven by said crank, and a cam follower contacting said actuating cam, said actuating cam having a contour causing oscillation of said counterbalance to produce a torque fluctuating between positive and negative values at the frequency of said fluctuation of said resultant load but oppositely disposed in phase, so as to oppose said fluctuation of said resultant load and substantially prevent the same from being applied to said shaft, said actuating cam having a hub portion surrounding said output shaft, said crank having a hub portion surrounding said output shaft, each of said hub portions being provided with a plurality of holes which can be aligned at different angular positions of said cam relative to said crank arm and a driving pin between said hub portions engageable in selected driving holes in said hub portions whereby the angular position of said cam relative to said crank may be varied through a series of increments to provide for adjusting the phase relationship between the fluctuating torque of said load and the fluctuating torque produced by said counterbalance and cam.

5. A driving mechanism for a crank driven load member producing a resultant load having a double frequency torque fluctuating between positive and negative values, said driving mechanism comprising a driving shaft carrying said crank, means to counteract the torque fluctuation of said resultant load including a counterbalance and means operated by said driving mechanism for causing oscillation of said counterbalance, said last named means comprising an actuating cam for said counterbalance mounted on said shaft and driven by said crank, and a cam follower contacting said actuating cam, said actuating cam having a contour causing oscillation of said counterbalance to produce a torque fluctuating between positive and negative values at the frequency of said fluctuation of said resultant load but oppositely disposed in phase so as to oppose said fluctuation of said resultant load and substantially prevent the same from being applied to said shaft, said actuating cam having a hub portion surrounding said output shaft, said crank having a hub portion surrounding said output shaft, the adjacent faces of said hub portions being provided with a series of jaws providing for engagement at different angular positions of said cam relative to said crank arm, and fastening members connecting said actuating cam and crank whereby said jaws of said adjacent faces are held in engagement at said different angular positions to provide for adjusting the phase relation between the fluctuating torque of said load and the fluctuating torque produced by said counterbalance and cam.

CHARLES M. PERKINS.
KARL D. KYSOR.

CERTIFICATE OF CORRECTION.

Patent No. 2,342,216.  February 22, 1944.

CHARLES M. PERKINS, ET AL.

It is hereby certified that error appears in the printed specification of the above numbered patent requiring correction as follows: Page 2, second column, line 18, after the word and period "counterweight." insert the following paragraph -

Figure 13:
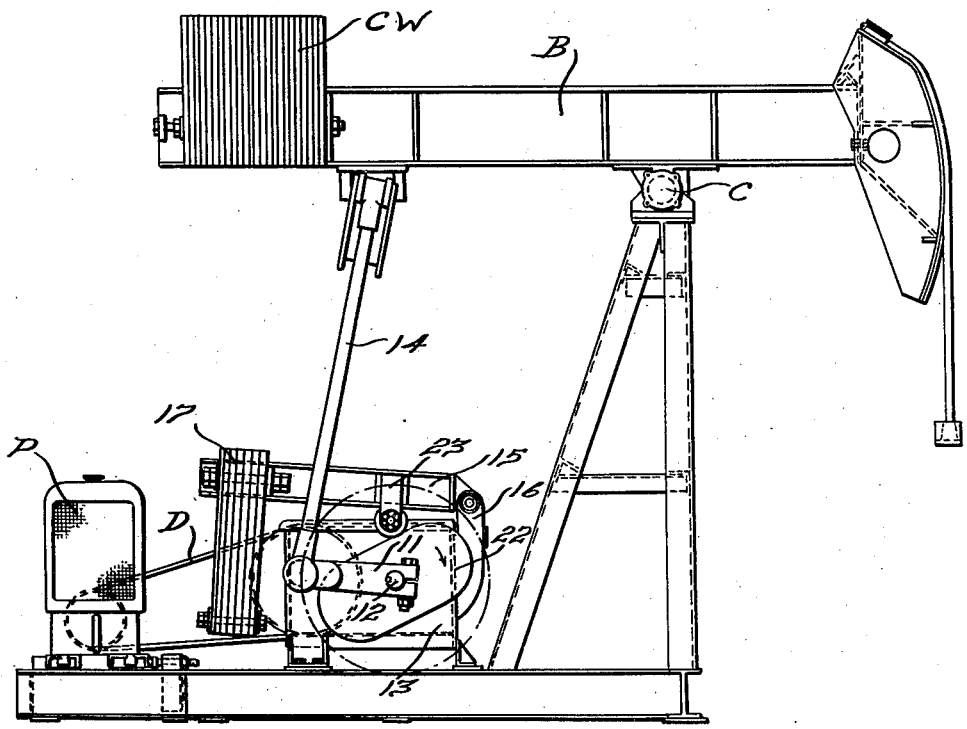
Fig. 13 is an elevation of an assembly of the counterbalance mechanism as applied to a walking beam and pumping unit employing oscillating type counterweight.
Figure 14:
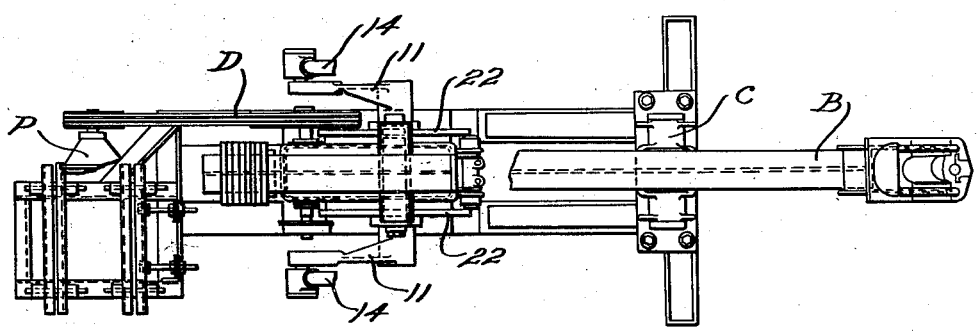

-- Fig. 14 is a top view of the unit shown in Fig. 13. -- ;

line 37, for "centilever" read --cantilever--; line 61, after "box." insert the following paragraphs -

-- For the purpose of showing the application of the cam 22, the beam 15, the counterweight 17 and associated parts in relation to the walking beam structure, the unit is shown in Figs. 11 and 12 as it might be used with a walking beam having a rotary counterbalance attached to rotate with the crank arm. In addition to the parts shown in Fig. 1, the drawings of Figs. 11 and 12 show a walking beam B mounted on pivot C with power plant P driving the previously mentioned gear box 13 through a belt D, the rotary type counterweights W being also shown. The top or plan view of Fig. 12 shows the relative position of the parts and also illustrates the use of dual cams 22, previously mentioned as used when dual crank and pitman assemblies are used.

Figs. 13 and 14 are views similar to Fig. 4 but include the type of walking beam unit in which the counterweight CW is mounted on the end of the walking beam. The other parts of the structure are marked with the same reference characters as in Figs. 11 and 12 to indicate similar parts. -- ;

line 70, for "portons" read --portions--; page 3, second column, line 25, after "that" insert --is that--; page 5, second column, line 51, claim 1, for "com" read --cam--; and that the said Letters Patent should be read with this correction therein that the same may conform to the record of the case in the Patent Office.

Signed and sealed this 13th day of June, A. D. 1944.

Leslie Frazer (Seal)  Acting Commissioner of Patents.